United States Patent [19]
Joubert

[11] Patent Number: 5,536,415
[45] Date of Patent: Jul. 16, 1996

[54] REMOVAL OF SULFATE IONS FROM SALINE SOLUTIONS COMPRISED THEREOF

[75] Inventor: Philippe Joubert, Lyons, France

[73] Assignee: Elf Atochem S.A., Puteaux, France

[21] Appl. No.: 319,224

[22] Filed: Oct. 6, 1994

[30] Foreign Application Priority Data

Oct. 6, 1993 [FR] France .................................. 93 11927

[51] Int. Cl.$^6$ .................................................. B01D 15/00
[52] U.S. Cl. ........................................... 210/670; 210/683
[58] Field of Search ..................................... 210/670, 683

[56] References Cited

U.S. PATENT DOCUMENTS 5,071,563  12/1991  Shiga et al. ............................. 210/683

Primary Examiner—Ivars Cintins
Attorney, Agent, or Firm—Burns, Doane, Swecker & Mathis

[57] ABSTRACT

Contaminating amounts of sulfate ions are removed from aqueous saline solutions comprised thereof by (i) contacting such saline solution with a zirconium compound, at an acidic pH, (ii) separating the resulting medium into (a) a saline solution depleted in sulfate ions and (b) a zirconium compound onto which said sulfate ions are sorbed, (iii) desorbing the sulfate ions from the stage (ii) zirconium compound at a basic pH, and (iv) separating the medium of desorption into (1) a basic aqueous solution enriched in sulfate ions and (2) a zirconium compound substantially devoid of sulfate ions, with the proviso that the zirconium compound is a novel hydrated zirconium hydroxide having the formula $Zr(OH)_4 \cdot xH_2O$, in which x ranges from 4 to 200, and such zirconium compound comprising an undried gelatinous precipitate thereof.

15 Claims, No Drawings

REMOVAL OF SULFATE IONS FROM SALINE SOLUTIONS COMPRISED THEREOF

BACKGROUND OF THE INVENTION

1. Field of the Invention

The present invention relates to the removal of sulfate ions present in aqueous saline solutions, in particular the sulfate ions present in various brine solutions.

2. Description of the Prior Art

Processes for decreasing the content of sulfate ions in electrolysis brines, while avoiding any discharge of toxic elements, have long been a desideratum in this art.

Treatments which generate less effluents, or at least discharging fewer toxic elements such as mercury or barium, are considered especially advantageous.

Thus, the removal of sulfate from brines by precipitation of barium sulfate presents a number of disadvantages:

(i) the requirement to conform to existing regulations relating to the contents of "free" Ba permissible in purification sludges;

(ii) in "mercury loops," the dumping of this contaminated sludge depends on its Hg content; and (iii) in brine loops of the chlorate processes, the discharges of chromium in $BaCrO_4$ form are also subject to governmental regulations.

Chemical processes based on the precipitation of sulfate ions do not avoid the discharge of other toxic elements present in the brine, especially mercury, unless a subsequent washing of the sludge is carried out.

In the case of low-concentration brines (100 g/l NaCl) the anionic resin process has a sulfate removal capacity which is very limited by the water balance. It does not, therefore, appear highly advantageous, although it may permit avoiding the discharge of Hg by a rinsing of the resin prior to elution.

Adsorption onto an inorganic substance appears to be the most promising route. Thus, substrates such as zirconium hydroxide exhibit a good affinity for sulfate ions.

The process described in U.S. Pat. No. 3,378,336 comprises purifying a brine on a cationic resin converted into barium form beforehand.

Alkaline earth metals such as magnesium and calcium displace barium which, thus released, precipitates in the form of barium sulfate.

This process presents many disadvantages:

(a) the risk of blocking of the resin by the formation of precipitates, (b) the release of Ba is a function only of the Ca and Mg content and not of that of sulfate ions. The barium-related problems remain.

U.S. Pat. No. 4,556,463 describes a process for removing sulfate values from brines by two conjugate means:

(1) cascading same over a weakly basic anionic resin and crystallization of the sulfate, (2) the waters introduced into the anionic loop are employed for diluting the depleted brine to 100 g/l of NaCl.

This latter process has a limited sulfate removal capacity. Indeed, the sulfate removal is directly related to the maximum amount of water that can be introduced into the brine loop.

U.S. Pat. No. 4,415,677 describes a process according to which a cationic resin is impregnated with a zirconium salt. Zirconium oxychloride is next converted into hydroxide form by means of aqueous ammonia:

$ZrOCl_2 + 2NH_4OH \rightarrow ZrO(OH)_2 + 2NH_4Cl$

Excess aqueous ammonia is washed with the brine. The 26% NaCl solution is acidified to pH=1 to 3 before transport through the column. At T=50° C., pH=1 and 10 B/h (BV: bed volume), the sulfate ion content can be decreased from 970 to 110 ppm.

U.S. Pat. No. 4,405,576 describes the addition of an acrylic acid monomer, which is polymerized in situ, to improve the binding of the zirconium compound. According to the reported example, the load ratio is approximately 5 g of $SO_4^=$ per liter of resin at pH=2.4, T=72° C. and at a sulfate ion concentration of 1.2 g/l.1

U.S. Pat. No. 4,415,678, issued to the same inventive entity, indicates that the load ratio attains 14 g of sulfate ions per liter of resin at pH=1.5 and T=65° C. The elution was conducted with water in all instances. The volumes of the solutions treated in the various reported examples do not exceed 10 BV and no indication is given as to the change in capacity after regeneration.

EP-427,256 to Kanegafuchi describes a process for the extraction of the sulfate ions present in brines using an adsorbent based on zirconium hydroxide/oxide. The ion-exchange mechanisms of the catalyst are:

(i) sorption in acidic medium: $2ZrO(OH)_2 + Na_2SO_4 + 2HCl \rightarrow (ZrOOH)_2SO_4 + 2H_2O + 2NaCl$ (ii) desorption in basic medium: $(ZrOOH)_2SO_4 + 2NaOH \rightarrow 2ZrO(OH)_2 + Na_2SO_4$ The final product is in the form of particles of a size of from 1 to 20 μm whose effectiveness is proportional to the number of surface OH groups. The sulfate ion content of a brine containing 200 g/l of NaCl can be decreased from 6.2 g/l to less than 0.5 g/l by this adsorbent. However, in the context of sulfate removal from chlorate electrolysis brines, there is a risk that chromium may be bound by the adsorbent and then discharged, the chromate being adsorbed by the adsorbent.

Strelko et al ["The selectivity of the sorption of sulfate ions by hydrated zirconium dioxide", *Zhurnal Fizicheskoi Khimii*, 64, 408–412 (1990)] describe the selectivity of hydrated zirconium oxide for sulfate adsorption. The zirconium compound employed has a dry solids content of 70%, namely comprising a compound which has an ignition weight loss identical with that of the compound employed in EP-427,256.

Japanese Patents Abstract CA-118127578, relating to a patent of Kanegafuchi, JP-A-300,652/92, describes a process for the removal of sulfate ions from brines, preliminarily dechlorinated, using $Zr(OH)_4$ particles (7–8 μm in size) as ion exchanger and of NaOH as the desorption compound.

Indeed, it is desirable to completely remove the $SO_4^=$ ions present in brines intended for the production of chlorine and soda, on the one hand, and of sodium chlorate, on the other, while avoiding the discharge of toxic materials. None of the aforesaid prior art processes completely avoids these problems.

SUMMARY OF THE INVENTION

Accordingly, a major object of the present invention is the provision of an improved process for the separation of sulfate ions from saline and brine solutions, comprising:

(i) contacting the saline or brine solution with a zirconium compound, at an acidic pH;

(ii) separation of the resulting medium into a saline or brine solution depleted in sulfate ions and the zirconium compound, onto which the sulfate ions are adsorbed;

(iii) desorption of the sulfate ions by treatment of the zirconium compound obtained in stage (ii) at a basic pH;

(iv) separation of the medium of desorption into a basic aqueous solution enriched in sulfate ions and a zirconium compound substantially free from or devoid of sulfate ions, with the proviso that said zirconium compound is a hydrated zirconium hydroxide having the formula $Zr(OH)_4 \cdot xH_2O$, wherein x ranges from 4 to 200, and present in the form of an undried gelatinous precipitate.

DETAILED DESCRIPTION OF BEST MODE AND PREFERRED EMBODIMENTS OF THE INVENTION

More particularly according to the present invention, by the term "undried gelatinous precipitate" is intended the formation of agglomerates which are intermediate between the gel and the bulky precipitates, as defined by A. Pierre in "Introduction aux procédés sol-gel," Septima publishers, page 7, Paris (1992) In the description that follows, reference will be made to the term "zirconium-laden gelatinous precipitate," or simply to the term "gelatinous precipitate".

In one preferred embodiment of the invention, the zirconium-laden gelatinous precipitate has the formula $Zr(OH)_4 \cdot xH_2O$, in which x ranges from 12 to 100, preferably from 12 to 25.

In a preferred embodiment of the process of the invention, the zirconium content of the gelatinous precipitate ranges from 5% to 60% by weight, expressed in % of $ZrO_2$ on a weight basis.

The brines containing sulfate ions to which the present invention is applicable include, for example, aqueous solutions of sodium chloride, potassium chloride, lithium chloride, and the like. There is no limitation on the chloride concentration of the brine containing the sulfate ions, the process according to the present invention being applicable equally as well whether the concentration of chloride ions is high or otherwise.

The undried zirconium-laden gelatinous precipitate is one of the important characteristics of the process of this invention. Indeed, the use of such undried gelatinous precipitate, comprising hydrated zirconium hydroxide, permits attaining sulfate ion removal efficiencies which are markedly higher than those of the prior art, in particular according to EP-0, 427,256.

This zirconium-containing gelatinous precipitate may be prepared by any suitable means known to the art of gelatinous precipitates. The gelatinous precipitate is generally prepared by precipitation of a zirconium-containing suspension. The latter may be initially neutral or acidic, for example if it is prepared by dissolving $ZrOCl_2 \cdot 8H_2O$ or basic zirconium sulfate, zirconium nitrate, or of the compound produced via hydrolysis of $ZrCl_4$. The precipitation is carried out by increasing the pH with an alkaline agent, in particular using $NH_4OH$ (pH>2 at least). The initial solution may also be basic if it is prepared by dissolving zirconyl carbonate. The precipitation may be carried out either by rendering the medium basic (pH>10) by means of a suitable alkaline agent such as $NH_4OH$ or $NaOH$, or by acidifying in order to decarbonate the solution by means of any acidic agent, in particular an inorganic acid. The Zr concentration of the starting solution is selected as a function of other operating parameters and is, for example, 0.2M/l. The starting solution is an aqueous solution. The precipitation is carried out at ambient temperature or at elevated temperature, up to the value of the boiling point of the medium. The precipitation is advantageously carried out at a temperature of approximately 80° to approximately 85° C. It is also advantageous to operate by starting with an acidic zirconium-containing solution and to adjust the pH of precipitation to a value of from 2 to 4.

The particle size of the Zr oxide constituting the gelatinous precipitate ranges from 1 to 20 µm, preferably from 2 to 10 µm. The precipitation process may include static stages during which the solution is maintained at rest. It is possible to sediment after a first precipitation, draw off the supernatant liquid, and again introduce fresh starting solution. This has the effect of a growth in the particle size of the grains and makes it possible to control the particle size distribution.

Furthermore, it is possible to operate batchwise, semicontinuously or continuously. The zirconium-containing gelatinous precipitate must not be subjected to any drying treatment in any case; it must only be drained and dewatered, namely, only the excess water must be removed.

The aforesaid zirconium-containing gelatinous precipitate, per se, is also featured by the present invention, as is the process for its preparation. Thus, the present invention also features a gelatinous precipitate of zirconium having the formula $Zr(OH)_4 \cdot xH_2O$, in which x ranges from 4 to 200.

In the gelatinous precipitate the zirconium is present in the form of a hydrated hydroxide of the formula $Zr(OH)_4 \cdot xH_2O$. However, all of the weight percentages of Zr will be expressed on the basis of the dioxide, i.e., $ZrO_2$.

The first stage of the process of the present invention entails bringing the brine at an acidic pH into contact with the zirconium-containing gelatinous precipitate in order to promote the adsorption of the sulfate ions. The acidic pH is controlled by the addition of an acid. Any nonsulfating acid is suitable, such as nitric, hydrochloric and other acids. Sulfuric acid should be avoided because the anions of this acid are $SO_4^=$, whereas hydrochloric acid is the preferred, the anion being $Cl^-$, that of the brine.

In another preferred embodiment, the pH of the acidic stage, i.e., of stage (i), ranges from 1 to 5, preferably from 2 to 4.

This first contacting stage to effect the adsorption of the $SO_4^=$ ions onto the gelatinous zirconium hydroxide precipitate may be carried out with stirring or otherwise, over a period of time ranging from 5 min to 3 hours. The temperature ranges from ambient temperature to the boiling point, preferably from 20° to 90° C., for example on the order of approximately 50°–80° C.

During this first stage the gelatinous zirconium precipitate and the sulfate ions are present in a $Zr/SO_4$ molar ratio of from 2 to 20, preferably from 5 to 15. The efficiency of the subject process makes it possible to lower this ratio in comparison with the prior art, and therefore to achieve savings of zirconium values, zirconium being a very expensive raw material.

Thus, in one specific embodiment, the $Zr/SO_4$ molar ratio during stage (i) ranges from 2 to 20.

The second stage of the process is the separation, on the one hand, into a solution depleted in sulfate ions, and, on the other, into a zirconium-laden gelatinous precipitate or cake, onto which the $SO_4^=$ ions have been adsorbed. This separation is carried out by any suitable means such as centrifuging, suction filtration, filtration-washing and the like. Filtration-washing entails filtration followed by washing with water. The temperature of application ranges from ambient temperature to the boiling point of the medium, preferably from 20° to 90° C. for example approximately 50°–80° C.

The third stage of the process comprises a desorption of the sulfate ions by treatment of the gelatinous precipitate (or cake) with an alkaline solution, to effect the desorption of the sulfate ions. Any aqueous alkaline agent is appropriate, such as alkali metal bicarbonate or carbonate, alkali metal hydroxide and the like. A preferred such agent is sodium hydroxide.

In one particular embodiment, the pH during the third stage ranges from 7 to 13, preferably from 8 to 11.

This stage may be carried out with stirring over a period of time of from 5 min to 3 hours. The temperature of application ranges from ambient temperature to the boiling point of the medium, preferably from 20° to 90° C., for example at approximately 50°–80° C., advantageously 50°–60° C.

The alkaline solution is an aqueous alkaline solution, and it is possible to add the gelatinous precipitate to the alkaline solution or the alkaline agent to the solution in which the gelatinous precipitate or cake has been introduced beforehand.

Thus, in an alternative embodiment, stage (iii) of the subject process is carried out by treatment of the gelatinous precipitate which has adsorbed the sulfate ions using an alkaline solution.

According to another alternative embodiment of the invention, stage (iii) of the subject process is carried out by addition of an alkaline agent to a solution in which the gelatinous precipitate which has adsorbed the sulfate ions has been dispersed beforehand.

The fourth stage of the process is the separation, on the one hand, into a solution enriched in sulfate ions and, on the other, into a zirconium-laden gelatinous precipitate or cake which is subjected to a washing operation. This separation is carried out by any appropriate means such as centrifuging with washing or filtration-washing. The filtration-washing entails a filtration followed by washing with water. The temperature of application advantageously ranges from 20° to 90° C., for example from approximately 50°–80° C.

In another embodiment of the invention, the temperature of application of the subject process ranges from 20° to 90° C., for example from 50°–80° C., advantageously 50°–60° C.

The gelatinous precipitate of hydrated zirconium hydroxide employed in the present invention may be employed once and then removed or, to the contrary, recycled. By virtue of the aforesaid improved properties, the gelatinous precipitate according to the present invention is particularly well suited for recycling, whether in its entirety or partially.

Thus, in another preferred embodiment of the invention, all or a fraction of the zirconium-laden gelatinous precipitate, advantageously washed and dewatered, is recycled to stage (i).

In order to further illustrate the present invention and the advantages thereof, the following specific examples are given, it being understood that same are intended only as illustrative and in nowise limitative.

It too will be appreciated that this invention is not limited to sulfate ions; it applies substantially equally as well to other ions exhibiting characteristics that are substantially similar to those of sulfate ions.

EXAMPLES

General Description of Test Procedure

A particular amount of zirconium hydroxide was added to 100 cm$^3$ of a brine containing either, in a first step, NaCl= 300 g/l and SO$_4^=$=20.5 g/l or, in a second step, NaCl=200 g/l and SO$_4^=$=4.2 g/l (conditions of European Patent EP-A-0, 427,256), the suspension was heated to 50° C. and the pH was adjusted to 3. The stirring period was 30 minutes.

At the end of this stage a filtration and washing with water were carried out. The entire mass (filtrate plus washes) was adjusted to a known volume and the determination of the SO$_4^=$ ions was then carried out. This permitted the production of a mass balance of the SO$_4^=$ ions bound to the solids.

The zirconium-laden cake loaded with sulfate ions was then resuspended in a solution containing sodium hydroxide in a concentration of 10 g/l (100 cm$^3$); the final pH ranged from 11 to 12. The suspension was maintained at 50° C. for 30 minutes. After this stage the suspension was filtered and the filter cake was then washed. The aqueous filtrate and washes were adjusted to a known volume in order to provide sulfate balances. In general, good agreement was observed between the bound quantities and those desorbed in basic medium.

EXAMPLE 1

Test Procedures with Prior Drying or Calcining of Zirconium Hydroxide (a) Synthesis of Zirconium Hydroxide 3,330 cm$^3$ of solution assaying for 0.2M/l of Zr were prepared by adding 215 g of ZrOCl$_2$·8H$_2$O. The pH was adjusted to 9.8, with stirring, by adding 264 cm$^3$ of NH$_4$OH assaying at 2%. After 15 minutes of stirring, the suspension was filtered and washed with water. The cake obtained was dried at 90° C. to constant weight. The ZrO$_2$ assay was determined by TGA by calcining the product at 1,000° C. (weight losses observed=12.1%).

The filter cake dried at 90° C. therefore contained 87.9% of ZrO$_2$ and corresponded to test 1—1. Different fractions were heated to 160° C.–240° C.–370° C.– 500° C. The weight losses observed between 90° C. and the test temperature are indicated below (i.e., relative to the dried cake) in tests 1-2 to 1-5.

TABLE I

| Test | Temperature | Weight loss % | ZrO$_2$ content |
|------|-------------|---------------|-----------------|
| 1-1  | 90° C.      | −12.1%        | 87.9%           |
| 1-2  | 160° C.     | −5.78%        | 93.29%          |
| 1-3  | 240° C.     | −8.4%         | 95.96%          |
| 1-4  | 370° C.     | −11.58%       | 99.41%          |
| 1-5  | 500° C.     | −11.61%       | 99.43%          |

(b) Adsorption of the Sulfate Ions

Approximately 10 g of powder were introduced in each test. The volume of brine employed was 100 cm$^3$ (NaCl=300 g/l and SO$_4$=20.79 g/l).

| Test temperature | 50° C. |
|------------------|--------|
| Final pH         | 3      |
| Test period      | 30 minutes |

The results obtained are reported in the Table II below:

TABLE II

| Test No. | T (drying) | Weight introduced (g) ZrO$_2$ | SO$_4$ | Weight bound SO$_4$ | SO$_4$ bound/ ZrO$_2$ introduced, weight % |
|---|---|---|---|---|---|
| 1-1 | 90 | 8.7926 | 2.079 | 0.4715 | 5.36% |
| 1-2 | 160 | 9.3378 | 2.079 | 0.414 | 4.43% |
| 1-3 | 240 | 9.632 | 2.079 | 0.344 | 3.57% |
| 1-4 | 370 | 9.9416 | 2.079 | 0.129 | 1.30% |
| 1-5 | 500 | 9.9525 | 2.079 | 0.084 | 0.84% |

EXAMPLE 2

In test 2, the zirconium-laden filter cake was dried at 40° C. (precipitation of zirconium hydroxide at pH 9.3).

The ZrO$_2$ content was determined by calcining at 1,000° C. the product dried at 40° C. The operating conditions and the solutions employed were the same as in Tests 1—1 to 1-5 above.

The results obtained are reported in Table III below:

TABLE III

| Test No. | T (drying) | Weight introduced (g) ZrO$_2$ | SO$_4$ | Weight bound SO$_4$ | SO$_4$ bound/ ZrO$_2$ introduced, weight % |
|---|---|---|---|---|---|
| 2 | 40 | 7.627 | 2.079 | 0.479 | 6.28% |

In this test, too, it was determined that an increase in the SO$_4$/ZrO$_2$ weight ratio was observed at lower drying temperature.

EXAMPLE 3

(a) Comparison with Prior Art Results (EP-427, 256)

The first three tests of Example 1 were considered and the material balances were calculated for 1 liter of brine (NaCl= 200 g/l and Na$_2$SO$_4$=6.2 g/l, i.e., SO$_4$=4.19 g/l). The results obtained are reported in the Table IV below:

TABLE IV

| Test No. | Initial Zr/SO$_4$ (mol) | Weight introduced, (g) ZrO$_2$ | SO$_4$ | SO$_4$ bound | SO$_4$ weight bound | SO$_4$ bound/ ZrO$_2$ introduced, weight % |
|---|---|---|---|---|---|---|
| Of Ex. 1 of the patent | 5.5 | 29.590 | 4.19 | 44% | 1.844 | 6.23% |
| Of Ex. 2 of the patent | 11 | 59.180 | 4.19 | 44% | 3.689 | 6.23% |
| Of Ex. 3 of the patent | 16.5 | 88.770 | 4.19 | 44% | 4.192 | 4.72% |

It was determined that the bound sulfate content calculated according to the data from the patent is substantially the same as that obtained using a powder dried at 40° C. (test 2).

EXAMPLE 4

Tests Starting With Undried Zirconium Hydroxide (a) Batchwise Precipitation of Hydrated Zr(OH)$_4$ 250 cm$^3$ of a 0.2M/l Zr solution were introduced, starting with ZrOCl$_2$·8H$_2$O. The precipitation of the zirconium was carried out at ambient temperature and to final pH of 9.45. After filtration-washing a wet cake was obtained weighing 99.1 and containing 8.625 g of ZrO$_2$. The formula of this hydrated zirconium hydroxide was Zr(OH)$_4$·7OH$_2$O.

(b) Sorption of the Sulfate Ions

Three cycles of adsorption in acidic medium and of desorption in basic medium (labelled 4-1, 4-2 and 4-3, respectively) were performed using these 99.1 g of wet gelatinous precipitate. 100 cm$^3$ of brine assaying at NaCl= 300 g/l and assaying at 20.79 g/l SO$_4$ were employed each time. At each stage it was a washed and undried cake that was employed for carrying out the next stage. The weight balances indicated below were calculated from the volumes of acidic filtrate+cake aqueous wash.

TABLE V

| Test No. | Weight introduced (g) ZrO$_2$ | SO$_4$ | Weight bound SO$_4$ | SO$_4$ bound/ ZrO$_2$ introduced, weight % |
|---|---|---|---|---|
| 4-1 | 8.625 | 2.079 | 1.849 | 21.44% |
| 4-2 | 8.625 | 2.079 | 1.849 | 18.08% |
| 4-3 | 8.625 | 2.079 | 1.849 | 17.61% |

It will be appreciated that retention ratios of the sulfate ions which were obtained are appreciably higher than those obtained with products dried beforehand, even at 40° C. and than those exhibiting an ignition weight loss lower than 30%.

EXAMPLE 5

Semicontinuous Tests of Zr(OH)$_4$ Precipitation (a) Preparation of the Gelatinous Precipitate at pH 8

The above gelatinous precipitates obtained at ambient temperature were difficult to filter because of the fineness of the elementary particles. The size of these particles was increased by conducting the precipitation at 85°–90° C.

In a reactor containing 250 cm$^3$ of Zr solution (0.2M/l), the pH was adjusted to 8 and then the Zr solution was added continuously while the pH was controlled at 8 (flow rate=1 l/h). The pH was controlled using an ammoniacal solution containing 20% by weight of $NH_3$.

The pH was measured in a vessel outside the reactor; this vessel was continuously charged with a circulation of suspension originating from the reactor by means of a pump; the suspension then dropped under gravity into the reactor. Once the reactor was full the feed was stopped and aging or maturing was permitted to occur for 30 minutes. The stirring was stopped to permit the suspension to settle. After settling, the supernatant liquid was drawn off. Once the reactor was partially drained, the reactor, with stirring restarted, was again fed with the same Zr solution and while the pH was controlled at 8 (T=85° C.).

The fact of operating semicontinuously permitted a particle growth and the median diameter thus changed from 2.63 microns to 5.08 microns at the end of the second precipitation cycle.

The gelatinous precipitate obtained had the following formula: $Zr(OH)_4 \cdot 92H_2O$.

At the end of these two precipitation cycles, all of the suspension was filtered and the filter cake was then washed. The dewatered cake was maintained as is for the sulfate sorption/desorption tests (mean $ZrO_2$ content=6.8%).

(b) Sorption of the Sulfate Ions

For the three tests whose results are reported in the following Table, a certain amount of undried zirconium hydroxide was introduced into 100 cm³ of brine.

| Temperature | 50° C. |
|---|---|
| Final pH | 3 |
| Time | 30 minutes |

As in the preceding tests, the acidic suspension was filtered and the filter cake washed. The filtrate and washes were adjusted to a known volume and the $SO_4^=$ content was then determined in order to produce the material balances. To ascertain the amount of $ZrO_2$ introduced per test, all of the cake originating from the desorption stage was dissolved in a known volume of 1M sulfuric acid. The zirconium was determined by ICP.

The results obtained are reported in the Table VI below:

TABLE VI

| Test | Weight introduced (g) | | Weight bound | $SO_4$ bound/ $ZrO_2$ introduced, |
|---|---|---|---|---|
| No. | $ZrO_2$ | $SO_4$ | $SO_4$ | weight |
| 5-1 | 7.9832 | 2.05 | 1.6425 | 20.57% |
| 5-2 | 0.6754 | 0.422 | 0.117 | 17.32% |
| 5-3 | 6.3488 | 0.422 | 0.4145 | 6.53% |

EXAMPLE 6

(a) Preparation of the Gelatinous Precipitate at pH 4

The operating procedure in these semicontinuous tests was substantially the same as the preceding one, other than the control pH, set at 4 (same T=85° C.). Three precipitation cycles were carried out, each cycle being interrupted by a stage of settling of the suspension and then by drawing off the clear supernatant phase. The formula of the hydrated zirconium hydroxide was $Zr(OH)_4 \cdot 20H_2O$.

The growth of the particles was monitored using a Coulter counter, at the end of each cycle:

TABLE VII

| | Mean diameter | |
|---|---|---|
| Cycle No. | Microns | % < 1.2 Micron |
| 1 | 2.65 | 18% |
| 2 | 4.54 | 1.50% |
| 3 | 5.04 | 0.90% |

(b) Sorption of the Sulfate Ions

The tests numbered 6 and 6' in the Table of results indicated below correspond to a simulation of recycling of the zirconium-laden cake resulting from a desorption in the basic medium. Two complete cycles of adsorption/desorption of the sulfate ions were therefore carried out.

| Temperature | 50° C. |
|---|---|
| Final pH of adsorption | 3 |
| Stirring period | 30 minutes |

As in the tests starting with the gelatinous precipitate No. 1, the amount of $ZrO_2$ introduced was determined after sulfuric dissolving of the entire filter cake. The material balances are reported in the Table VIII below:

TABLE VIII

| Test | Weight introduced (g) | | Weight bound | $SO_4$ bound/ $ZrO_2$ introduced, |
|---|---|---|---|---|
| No. | $ZrO_2$ | $SO_4$ | $SO_4$ | weight % |
| 6 | 28.0409 | 2.05 | 2.02 | 7.20% |
| 6' | 28.0409 | 2.05 | 2.045 | 7.29% |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the removal of sulfate ions from an aqueous saline solution thereof, comprising (i) contacting such saline solution with a zirconium compound, at an acidic pH, (ii) separating the resulting medium into (a) a saline solution depleted in sulfate ions and (b) a zirconium compound onto which said sulfate ions are sorbed, (iii) in an aqueous medium, desorbing said sulfate ions from said stage (ii) zirconium compound at a basic pH, and (iv) separating the medium of desorption into (1) a basic aqueous solution enriched in sulfate ions and (2) a zirconium compound substantially devoid of sulfate ions, wherein said zirconium compound is an undried gelatinous precipitate comprising a hydrated zirconium hydroxide having the formula $Zr(OH)_4 \cdot xH_2O$, in which x ranges from 4 to 200.

2. The process as defined by claim 1, said hydrated zirconium hydroxide having the formula $Zr(OH)_4 \cdot xH_2O$, in which x ranges from 12 to 100.

3. The process as defined by claim 2, wherein said formula $Zr(OH)_4 \cdot xH_2O$, x ranges from 12 to 25.

4. The process as defined by claim 1, wherein the amount of zirconium contained in said undried gelatinous precipitate ranges from 5% to 60% by weight, based on the weight of $ZrO_2$.

5. The process as defined by claim 1, wherein the molar ratio $Zr/SO_4$ during stage (i) ranges from 2 to 20.

6. The process as defined by claim 1, wherein stage (i) is carried out at a pH ranging from 1 to 5.

7. The process as defined by claim 6, wherein stage (i) is carried out at a pH ranging from 2 to 4.

8. The process as defined by claim 7, wherein stage (iii) is carried out at a pH ranging from 8 to 11.

9. The process as defined by claim 6, wherein stage (iii) is carried out at a pH ranging from 7 to 13.

10. The process as defined by claim 1, stage (ii) comprising a filtration step and optionally comprising a washing step.

11. The process as defined by claim 1, stage (iv) comprising a filtration and a washing step.

12. The process as defined by claim 1, carried out at a temperature ranging from 20° to 90° C.

13. The process as defined by claim 1, said starting saline solution containing sulfate ions comprising an aqueous solution of sodium chloride, potassium chloride, or lithium chloride.

14. The process as defined by claim 1, said starting saline solution containing sulfate ions comprising a brine.

15. The process as defined by claim 1, comprising recycling said stage (iv) zirconium compound substantially devoid of sulfate ions to stage (i).

* * * * *